United States Patent
Wolf et al.

(10) Patent No.: US 9,942,179 B2
(45) Date of Patent: *Apr. 10, 2018

(54) SCHEDULE BASED EXECUTION WITH EXTENSIBLE CONTINUATION BASED ACTIONS

(71) Applicant: Microsoft Technology Licensing, LLC, Redmond, WA (US)

(72) Inventors: Kenneth David Wolf, Seattle, WA (US); Clark Roberts, Seattle, WA (US); Leon Ezequiel Welicki, Issaquah, WA (US); Andrei Romanenko, Sammamish, WA (US); Christopher Lloyd Gillum, Kirkland, WA (US); Kevin Lam, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/070,749

(22) Filed: Mar. 15, 2016

(65) Prior Publication Data

US 2016/0197863 A1 Jul. 7, 2016

Related U.S. Application Data

(63) Continuation of application No. 13/727,414, filed on Dec. 26, 2012, now Pat. No. 9,292,342.

(51) Int. Cl.
*G06F 9/48* (2006.01)
*H04L 12/58* (2006.01)
(Continued)

(52) U.S. Cl.
CPC .............. *H04L 51/04* (2013.01); *G06F 9/485* (2013.01); *H04L 67/10* (2013.01); *H04L 67/32* (2013.01); *H04L 41/5096* (2013.01)

(58) Field of Classification Search
CPC ................................ H04L 41/22; H04L 67/00
See application file for complete search history.

(56) References Cited

U.S. PATENT DOCUMENTS 7,440,973 B2    10/2008    Tsukerman et al.
7,484,221 B2 *   1/2009    Rivera ................ G06F 11/3476
                                                            717/130

(Continued)

OTHER PUBLICATIONS

How to Supercharge All Your Favorite Webapps with ifttt, LifeHacker.com by Adam Pash Sep. 21, 2011, http://lifehacker.com/5842307/how-to-supercharge-all-your-favorite-webapp-s-with-ifttt.*

(Continued)

*Primary Examiner* — Jimmy H Tran
(74) *Attorney, Agent, or Firm* — Workman Nydegger

(57) ABSTRACT

Generally in a computing environment, executing work based on time (i.e. according to a predetermined schedule) is a common need. However, in cloud based systems, scheduled work may be expensive to customers as generally customers rent system resources. Thus, having a processor dedicated to performing actions that have been pre-scheduled can be expensive. This application describes using a continuation-based runtime for scheduling time-bound and/or periodic work in a distributed (i.e. cloud) system. A system architecture and computer-implemented method are described that deploy an environment-independent action to a remote-based system (such as a cloud computing system, for example). The action is limited to using a predetermined amount of resources and is limited to simple, non-cpu intensive orchestrations of network calls. A schedule is defined for the action, and the action is then called in a processor-independent fashion (for example, by using a (Continued)

continuation based runtime) such that state of the action is maintained independent of the processor on which the action is being executed.

20 Claims, 3 Drawing Sheets

(51) Int. Cl.
*H04L 29/08* (2006.01)
*H04L 12/24* (2006.01)

(56) References Cited

U.S. PATENT DOCUMENTS

| | | | | |
|---|---|---|---|---|
| 7,672,924 B1* | 3/2010 | Scheurich | ......... | G06F 17/30392 707/999.002 |
| 7,716,403 B2* | 5/2010 | Hall | .................. | G05B 19/4186 709/231 |
| 7,716,672 B2* | 5/2010 | Douceur | ............... | G06F 9/4881 718/102 |
| 7,882,236 B2 | 2/2011 | Lovering et al. | | |
| 7,921,216 B2 | 4/2011 | Critchley et al. | | |
| 7,930,684 B2* | 4/2011 | Roeck | ................. | G06F 11/2028 714/100 |
| 8,209,687 B2 | 6/2012 | Yuyitung et al. | | |
| 8,250,131 B1* | 8/2012 | Pulsipher | ............. | G06F 9/4843 709/201 |
| 8,522,240 B1* | 8/2013 | Merwarth | .......... | G06Q 10/0631 705/26.82 |
| 8,566,937 B2 | 10/2013 | Haga et al. | | |
| 8,600,536 B2 | 12/2013 | Sundling et al. | | |
| 8,621,475 B2 | 12/2013 | Matsa et al. | | |
| 8,682,955 B1* | 3/2014 | Monden | ................. | G06Q 10/06 709/201 |
| 8,739,176 B1* | 5/2014 | Darling | ................ | G06F 9/4818 718/103 |
| 8,893,140 B2 | 11/2014 | Meyer | | |
| 9,037,152 B1* | 5/2015 | Herrera | ................ | H04W 64/00 370/338 |
| 9,128,703 B1* | 9/2015 | Lachwani | ............. | G06F 1/3203 |
| 9,172,738 B1* | 10/2015 | daCosta | ................. | H04L 67/00 |
| 9,392,049 B2* | 7/2016 | Ennis | | |
| 9,442,467 B1* | 9/2016 | Behbehani | ............... | G05B 1/01 |
| 2006/0026212 A1* | 2/2006 | Tsukerman | ....... | G06F 17/30289 |
| 2006/0085691 A1 | 4/2006 | Rivera et al. | | |
| 2006/0150200 A1* | 7/2006 | Cohen | .................... | G06F 9/547 719/328 |
| 2006/0174016 A1* | 8/2006 | Critchley | ................ | G06F 9/546 709/228 |
| 2006/0178152 A1* | 8/2006 | Lovering | ................ | G06F 9/546 455/450 |
| 2007/0239505 A1* | 10/2007 | Shukla | .................... | G06F 9/485 705/7.27 |
| 2007/0266390 A1* | 11/2007 | Emmerich | ............ | G06F 9/5066 718/105 |
| 2009/0070771 A1* | 3/2009 | Yuyitung | ............... | G06Q 10/06 718/105 |
| 2009/0150891 A1* | 6/2009 | Matsa | ................... | G06F 9/4881 718/103 |
| 2009/0199192 A1* | 8/2009 | Laithwaite | ............ | G06Q 10/06 718/104 |
| 2010/0287025 A1* | 11/2010 | Fletcher | ................. | G06Q 10/06 705/7.15 |
| 2011/0145826 A1* | 6/2011 | Talbert | ....................... | G06F 8/20 718/102 |
| 2011/0161912 A1* | 6/2011 | Eteminan | ................... | G06F 8/20 717/101 |
| 2011/0289503 A1* | 11/2011 | Toub | ...................... | G06F 9/4843 718/102 |
| 2012/0054754 A1* | 3/2012 | Teichmann | ........... | H04L 41/082 718/102 |
| 2012/0158453 A1* | 6/2012 | Chung | .................... | G06Q 10/06 705/7.26 |
| 2012/0260118 A1* | 10/2012 | Jiang | ...................... | G06F 9/4843 713/340 |
| 2012/0291138 A1* | 11/2012 | Haga | ......................... | G06F 21/51 726/27 |
| 2013/0111033 A1* | 5/2013 | Mao | ........................ | G06F 9/5072 709/226 |
| 2013/0191836 A1* | 7/2013 | Meyer | ............ | G06Q 10/063114 718/103 |
| 2013/0268942 A1* | 10/2013 | Duluk, Jr. | ............. | G06F 9/4881 718/104 |
| 2013/0297060 A1* | 11/2013 | Sundling, Jr. | ....... | G06Q 10/0631 700/100 |
| 2014/0032663 A1* | 1/2014 | Ennis | .................. | H04L 67/1002 709/204 |
| 2014/0108486 A1* | 4/2014 | Borzycki | ............ | G06F 21/6218 709/201 |
| 2014/0366031 A1 | 12/2014 | Jiang et al. | | |
| 2015/0074279 A1* | 3/2015 | Maes | ..................... | G06F 9/5072 709/226 |

OTHER PUBLICATIONS

Ifttt the beginning . . . , IFTTT Blog, blog.ifttt.com by Linden Tibbets, Dec. 14, 2010, http://blog.ifttt.com/post/2316021241 /ifttt-the-beginning.*

"Grand Central Dispatch (GCD) Reference", Retrieved from <<http://web.archive.org/web/20111010140734/http://developer.apple.com/library/mac/#/web/20111011183956/https://developer.apple.com/library/mac/documentation/Performance/Reference/GCD_libdispatch_Ref/Reference/reference.html>>, Retrieved on: Nov. 22, 2012, 53 Pages.

"SafeGuard Enterprise Administrator Help", Retrieved from <<https://www.sophos.com/en-us/medialibrary/PDFs/nonindexed/sgn_56_h_eng_admin_help.pdf?la=en>>, Apr. 2011, 278 Pages.

"Non-Final Office Action Issued in U.S. Appl. No. 13/727,414", dated Jun. 1, 2015, 11 Pages.

"Notice of Allowance Issued in U.S. Appl. No. 13/727,414", dated Nov. 16, 2015, 8 Pages.

Blythe, et al., "Task Scheduling Strategies for Workflow-based Applications in Grids", In Proceedings of the IEEE Fifth International Symposium on Cluster Computing and the Grid, vol. 02, May 9, 2005, pp. 759-767.

Huang, et al., "A Workflow for Runtime Adaptive Task Allocation on Heterogeneous MPSoCs", In Proceedings of Design, Automation & Test in Europe Conference & Exhibition, Mar. 14, 2011, 6 Pages.

Montrose, Kevin, "Servicing Background Tasks on a Large Site", Retrieved from <<http:/ programmers. stackexchange.com/questions/13711/servicing-background-tasks-on-a-large-site>>, Oct. 22, 2010, 13 Pages.

Swartz, Alon, "Background Task Processing and Deferred Execution in Django", Retrieved from <<https://www.turnkeylinux.org/blog/django-celery-rabbitmq>>, Feb. 24, 2010, 9 Pages.

Wang, et al. "Process as a Service-Distributed Multi-Tenant Policy-Based Process Runtime Governance", In proceedings of IEEE International Conference on Services Computing, Jul. 5, 2010, pp. 578-585.

* cited by examiner

SCHEDULE BASED EXECUTION WITH EXTENSIBLE CONTINUATION BASED ACTIONS

CROSS-REFERENCE TO RELATED APPLICATIONS

This application is a continuation of U.S. patent application Ser. No. 13/727,414 filed on Dec. 26, 2012, entitled "Schedule Based Execution with Extensible Continuation Based Actions," and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has allowed for so called cloud computing. In this description and the following claims, "cloud computing" is defined as a model for enabling ubiquitous, convenient, on-demand network access to a shared pool of configurable computing resources (e.g., networks, servers, storage, applications, and services) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Generally in computing, executing work based on time (i.e. according to a predetermined schedule) is a common need. It may be desirable to perform so called "task scheduling". Often this is complemented by the need of running this work in a periodic manner. Examples of scenarios where this capability is needed include periodic cleanup of data, polling a third party service to push notifications, aggregating data at the end of a business day, periodically monitoring the state of a service, pinging a service to keep it alive, and eager refreshing of a cache.

There are multiple ways of performing these actions. One such way includes a pure brute force method, such as having an application running forever checking the time and executing the work. However, in remote based systems, such as so-called cloud based systems, this can be very expensive to customers as generally customers rent system resources and having a processor dedicated to performing actions that have been pre-scheduled can be expensive. For example, in cloud based system customers may have to create a service that is constantly running checking the time and executes work accordingly when it reaches the target time based on configuration or data hardcoded in the code of the service. These polling based approaches have several drawbacks, both technical and economic: on the technical side, if the polling process dies then the target work may be never executed. For example, hardware failures may cause a polling process to die. Cloud based systems run on commodity hardware, and as such, hardware failures are fairly common. Adding reliability increases considerably the complexity of the solution. On the economic side, having a service constantly running to monitor for pre-scheduled actions, even when there is no work to run, is costly. For example, imagine if work is scheduled to be executed every 3 days, but the system polls for work every 2 minutes. Assuming that the scheduling challenge is solved, there is still another part to this problem: performing the actual work.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a remote based system. The method includes acts for scheduling a scheduled and optionally periodic action in a remote based system. The method includes deploying an environment independent action to a remote based system. The action is limited to using a predetermined amount of resources and is limited to simple, non-CPU intensive orchestrations of network calls. The method further includes defining a schedule for the action to be executed. Calling the action at the remote based system based on the schedule in a processor independent fashion such that state of the action and the schedule is maintained independent of the processor that the action is being executed on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein use a continuation based runtime for scheduling time-bound and/or periodic work. The embodiments can leverage continuation based runtimes to provide predictable and reliable execution of work. Alternatively or additionally, embodiments may use runtime visibility to provide full transparency to a user using an execution log. This can be used for troubleshooting, reporting, auditing or for other uses. Additionally or alternatively, embodiments can implement open continuation-based extensibility of scheduled actions for time bound and period work. Additionally or alternatively, embodiments can include functionality for scheduling complex/arbitrary compositions based on time binding and period. For example, anything from simple sequential or parallel compositions to more complex state machines may be implemented.

A continuation based runtime executes actions. An action represents a unit of executable code including multiple pulses of work. Users of the continuation based runtime are provided with a library of actions that they can use to write their programs. Users can also create their own actions by composing existing ones or writing new code. Some embodiments described herein may be implemented on top of Windows Workflow Foundation (WF), an existing implementation of a continuation based runtime available from Microsoft® Corporation of Redmond Wash.

The remote based, time bound, or period scheduling service is a multi-tenant service (meaning that multiple different entities or enterprises can access service functionality securely with shared resources) that allows users to create reliable, recurring timer jobs with workflow-based actions. It may be built on top of other remote based (e.g. so called "cloud" based) workflow services, such as the core Windows Azure™ Workflow Service available from Microsoft® Corporation of Redmond Wash. By leveraging the workflow subsystem, actions created through the remote based, time bound, or period scheduling service can be reliably executed in the face of network and machine failures. Alternatively or additionally, such a system allows for complex orchestrations to be performed on a schedule.

Figure 1:
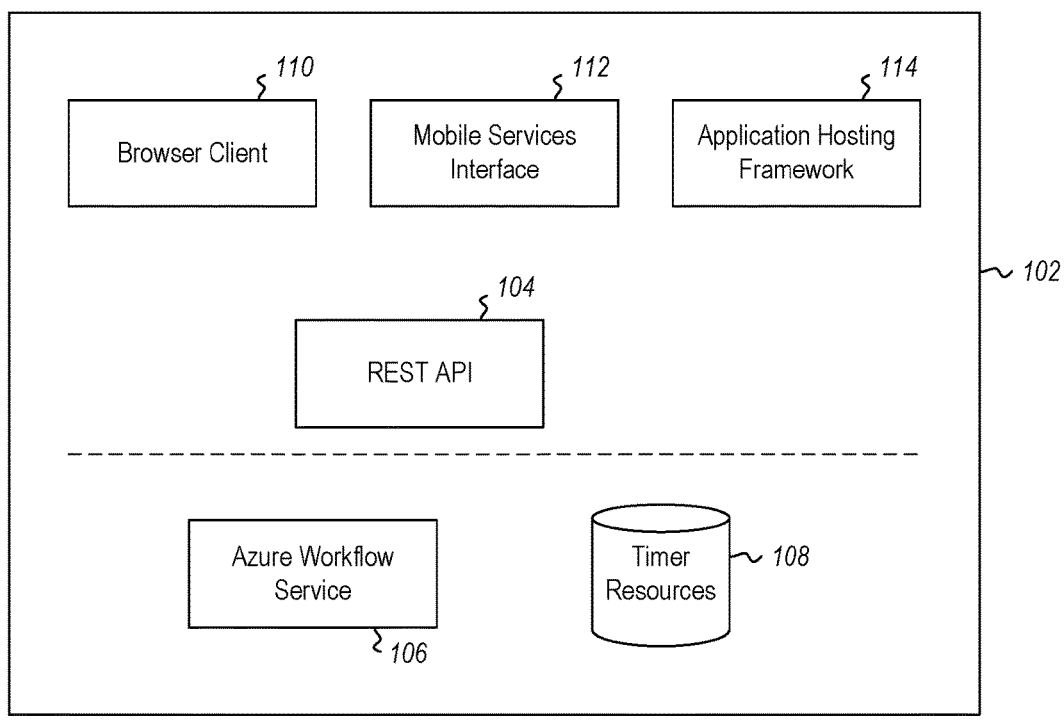
FIG. 1 illustrates a remote based action scheduling system.

As illustrated in FIG. 1, the remote based, time bound, or period scheduling service 102 is comprised of three major components: a front end 104, a back end 106 and a data store 108.

In the illustrated example shown in FIG. 1, while other types of services may be used, the front end 104 is a Representational State Transfer (REST)-full service. In some embodiments, this service may be built on the ASP-.NET MVC Web API available from Microsoft® Corporation or on other appropriate components. The front end 104 provides an access point for a user to interact with the service 102 to schedule time bound or periodic actions. The front end may also include functionality for providing a user with access to information about runtime state. This information can be current runtime state or state that has been collected over time. This may be used to provide reporting functionality to the user or so that a user can assess what portions of a scheduled action have been completed.

In the example illustrated in FIG. 1, the front end 104 is illustrated as interacting with three different components including a browser client 110, a mobile services interface 112 and an application hosting framework 114. These different components can provide different access points into the front end 104 and different methods for user to access the front end 104. In some embodiments, the browser client 110 may be Internet Explorer® available from Microsoft® Corporation of Redmond Wash. The mobile services interface 112 may be Windows Azure® Mobile Services available from Microsoft® Corporation of Redmond Wash. The application hosting framework 114 may be the hosting platform Windows Azure® Web Sites available in Windows Azure® mobile services available from Microsoft® Corporation of Redmond Wash.

The back end 106 may be a workflow service configured to process continuation based runtime workflows. One example of such a service is Windows Azure™ hosted Workflow Service available from Microsoft® Corporation of Redmond Wash.

The data store 108 may be implemented as a database that contains basic configuration/"design time" information. The data store may further include reporting data, such as a completed actions history. In some embodiments, the data store 108 may be implemented as part of the back end 106.

A set of actions are deployed at the back end 106 workflow service (e.g. a workflow service running on Windows Azure™). These actions provide pre-built functionality that will be configured by callers of the remote based, time bound, or period scheduling service 102. These actions are composite actions (i.e. actions composed of other actions) that implement scheduling semantics. Such scheduling semantics may include, for example, a single execution at a pre-specified time (e.g. "perform the action once at 5:00 P.M.") or periodic execution (e.g. "perform the action every weekday at 5:00 P.M.").

Figure 2:
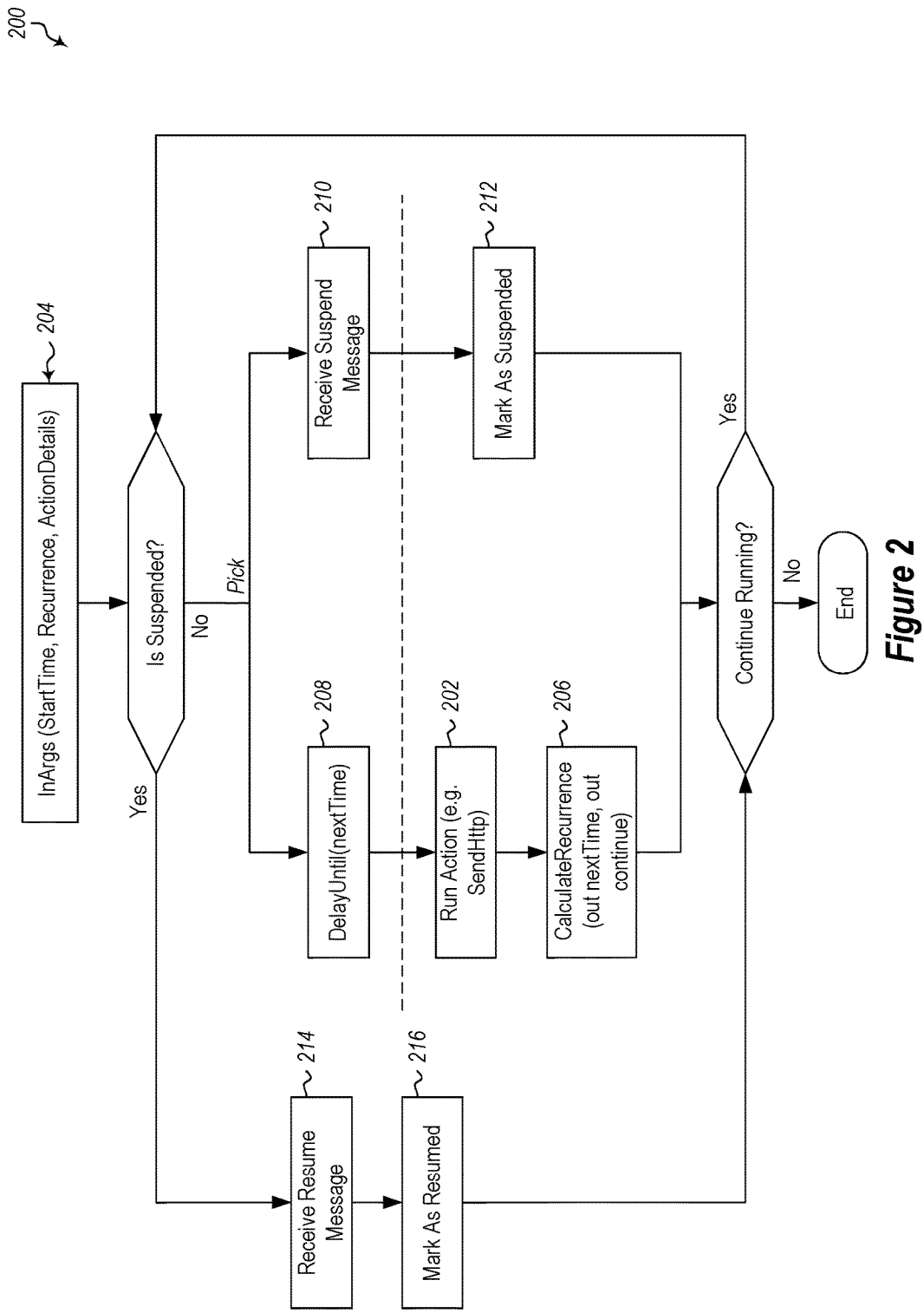
FIG. 2 illustrates a flow diagram illustrating acts for scheduling actions.

FIG. 2 shows an example of a flow 200 for running a time bound periodic action 202. The action 202 shown in FIG. 2 is a general representation and the action can be further abstracted, to the point that the action can be any composition of any existing actions (e.g. sending an email and an http message in parallel).

A user can specify various arguments 204. For example, a user can specify a start time, recurrence, and action details. This action will be invoked based on the schedule defined by basic recurrence patterns (e.g. recur every N mseconds/seconds/minutes/hours/days/weeks/months/years). If no recurrence is specified then this action 202 will only execute once.

Embodiments may implement a set of control operations within the workflow itself so that a long-running recurrence can be suspended, resumed, or updated mid-flight. Cancellation or termination notifications may be also implemented within the workflow itself, but in some embodiments this may not be needed as those notifications may be provided natively by a workflow service, such as the backend 106. In particular, Windows Azure™ Workflow Service provides these features natively.

The service 102 can support simple recurrence (e.g. run every 5 minutes) or more advanced recurrence patterns (e.g. run the second Wednesday of every month). The recurrence can be calculated by the CalculateRecurrence module 206. A DelayUntil module 208 can delay actions until they are scheduled to be run.

In some embodiments, the wire format for a remote based, time bound, or period scheduling service job is a JSON object comprised of three pieces of data as shown by the arguments 204:

The time to run the job

The primary action to perform when the timer fires and/or an error action that is executed when the primary action fails (Optionally) When and how often to repeat the job This information can be entered into the arguments 204. Note that while in the present example, a JSON object is used, it should be appreciated that in other embodiments, other types of objects may be used.

A fully comprehensive timer job example is now illustrated.

```
{
 "startTime": "2012-08-04 00:00Z", // required
 "action":
 {
  "type": "http",
  "request":
  {
   "uri": "http://contoso.com/foo",      // required
   "method": "PUT",                       // optional (default to POST)
   "body": "Posting from a timer",        // optional
   "headers":
   {
    "Content-Type": "application/json"
   },
  },
 },
 "errorAction":
 {
  "type": "http",
  "request":
  {
   "uri": "http://contoso.com/notifyError",
   "method": "POST",
  },
 },
 "recurrence": // optional
 {
  "unit": "month",          // can be "year" "month" "day" "week" "minute" "second"
  "period": "1",             // optional, how often to fire (default to 1)
  "recurrenceCount": "10",   // optional (default to recur infinitely)
  "endTime": "2012-11-04",   // optional (default to recur infinitely)
 },
 "metadata": // optional
 {
  "service": "route planner",
  "component": "real time traffic update",
  "place": "seattle-wa",
 },
 "state": "suspended", // running, suspended, completed, or canceled
 "stateDetails": "suspending for the winter holidays", // optional
 "status": // controlled by CRON service
 {
  "lastExecutionTime": "2007-03-01T13:00:00Z",
  "nextExecutionTime": "2007-03-01T14:00:00Z ",
  "history": "http://..../jobid/history"
 },
}
```

The following illustrates details related to start time. While there is no official standard in JSON for Date/Time fields, the general consensus in the industry is to use ISO-8601. ISO-8601 allows the caller to specify a time zone on the wire. The remote based, time bound, or period scheduling service 102 will deserialize any specified time, but, in some embodiments, any times output by the remote based, time bound, or period scheduling service 102 will be in UTC. Recipients (including any portal used) can make adjustments to display this time in a user's local time zone.

Actions are ultimately converted into a set of processes on the back-end 106. Some embodiments may be limited to only support HTTP actions so as to limit the actions that can be performed to non-CPU intensive orchestrations of network calls. In the example illustrated above, an action will send an HTTP request to the provided target URL with the given content. A user can provide optional callbacks that embodiments can HTTP POST to upon either success (HTTP 2XX response code) or failure (HTTP non-2XX response code).

While the above example illustrates limiting to HTTP actions so as to limit the actions that can be performed to non-CPU intensive orchestrations of network calls, other embodiments may be able to allow other limited actions that still limit embodiments to non-CPU intensive orchestrations of network calls. For example, embodiments may allow for sending mail, posting social media updates, simple administrative actions, etc. Simple chaining of non-CPU bound http actions, while maintaining an intermediate state can enable very powerful scenarios. For instance, one scenario may include obtaining an authentication token from an access control service, and then calling into a restricted resource. Chaining actions in enabled natively by using continuation based runtimes.

The following illustrates an example HTTP action in accordance with the principles described previously herein.

```
{
 "type": "http",
 "request":
 {
  "uri": "http://contoso.com/foo",      // required
  "method": "PUT",                       // optional (default to POST)
  "body": "Posting from a timer",        // optional
  "headers":
  {
   "Content-Type": "application/json"
  },
 },
},
```

Embodiments may include error actions. For example, the user can provide an action that will be executed in the case of a failure of the primary action. This can be used for logging responses, or more complex error handling logic. Just like the primary action, the error action can be simple or composite logic based on other actions.

Timers can optionally be marked as recurring, in which case embodiments will automatically set them up to re-fire again based on the provided recurrence period. An example format of the recurrence period may be as follows:

```
{
 "unit": "month",   // can be "year", "month", "day", "week", "minute"
 "period": "1",      // optional, how often to fire (default to 1)
 "recurrenceCount": "10", // optional (default to recur infinitely)
 "endTime": "2012-11-04", // optional (default to recur infinitely)
}
```

In some embodiments, if both recurrenceCount and endTime are specified, the job will be rejected. This may be done by providing with an HTTP 400 error response. In other embodiments, the first condition hit will signal the end of the schedule.

Embodiments may include support for metadata. The metadata is a set of user provided key-value pairs. This can be used to query for jobs and/or add descriptions to the job.

Some embodiments do not allow an arbitrary number of key-value pairs. In some embodiments, the user is limited to a small number such as ten metadata values, which limits the impact an individual user can have on the data store.

Some embodiments may include support for status information. An example of the state properties is as follows:

```
"state": "suspended", // running, suspended, completed, or canceled
"stateDetails": "suspending for the winter holidays", // optional
```

Some embodiments may include support for status information. Once a remote based, time bound, or period scheduling service job has started, information will be returned about the current status of the job. This object is not settable by the user. However, in some embodiments, it is included in the job object (rather than a separate linked resource) so that clients can have a simple mechanism for obtaining the status of their jobs using bulk HTTP GET actions on /jobs. To maintain the job object to contain user settable state as much as possible, embodiments encapsulate all of the non-settable properties into a separate sub-object, rather than hanging them off of the root job object. In some embodiments, two pieces of job status information can be provided by the user. The first is an enumeration of whether the job is running, suspended, completed, or canceled. The user can HTTP PUT jobs in the running or suspended status, and HTTP PATCH active jobs to any other status. If a job has been completed or canceled, that is a final status that cannot be updated (though the job can still be HTTP DELETEd). In addition to this enumeration, a stateDetails field is available for users to provide documentation on the reason for their status change.

Job status includes the time of the previous execution (if any), the time of the next scheduled execution (for in-progress jobs), and a link to the job's history. The following illustrates an example:

```
{
  "lastExecutionTime": "2007-03-01T13:00:00Z",
  "nextExecutionTime": "2007-03-01T14:00:00Z ",
  "history": "http://..../jobid/history"
}
```

Putting this all together, the following timer job would post a daily status update to the fictional social network service foo.com on a user's behalf:

```
{
  "startTime": "2012-08-04 00:00",
  "action":
  {
    "type": "http",
    "request":
    {
      "uri": "https://graph.foo.com/me/feed",
      "body": "Posting from a timer",
    },
  },
  "recurrence":
  {
    "unit": "day",
    "period": "1"
  }
}
```

The following illustrates remote based, time bound, or period scheduling service job management. Embodiments may be implemented where all of the REST APIs are relative to the tenant's base address (e.g. http://timers.cloudapp.net/contoso/). The URL format accounts for a tenant having multiple "users" of remote based, time bound, or period scheduling service, and the user and remote based, time bound, or period scheduling service job IDs are embedded in that URL. A remote based, time bound, or period scheduling service job is therefore accessed at the following URL (a "job address"):

http://timers.cloudapp.net/<tenant_name>/jobs/<job-name>

Some operations support batching. In these cases, key-value tags can be provided as parameters to the jobs URL (i.e. /jobs(key1=value1,key2=value2).

The following illustrates details related to creating a remote based, time bound, or period scheduling service job for one very specific example embodiment. Remote based, time bound, or period scheduling service jobs are created through a simple HTTP PUT operation to a job's address. The resource name is the public name of the job. The payload is a JSON object representing the timer job. Additional metadata can be provided as part of creating a remote based, time bound, or period scheduling service job, which allows a user to query for sets of jobs (for example, actions can be associated with different users of my multi-tenant cloud based system application). If a job name is not provided in the HTTP PUT request (either through the URI or the payload), then one will be generated by the service.

This call results in an HTTP 201 message (indicating that the request has been fulfilled and that a new job has been created) on success. The location of the newly created job will be provided in the HTTP Location response header.

Embodiments may include functionality for listing remote based, time bound, or period scheduling service jobs. The status of an individual job can be accessed by a HTTP GET call to a job's address. The full list of a user's jobs can be accessed by excluding a jobid in the HTTP GET call (i.e. /jobs).

Embodiments may include functionality for filtering remote based, time bound, or period scheduling service jobs by metadata. To fetch the status of all jobs related to say, an application, the user would have to query using his/her provided metadata {key, value} pairs. For example, a HTTP GET call with <job-address>/jobs(service=routeplanner, component=real-time-traffic-update).

Embodiments may include functionality for deleting a remote based, time bound, or period scheduling service job. To delete a remote based, time bound, or period scheduling service job, a user may send a HTTP DELETE request to a job's address. The full list of a user's jobs can be deleted by excluding a jobid from the HTTP DELETE call (i.e. /jobs). Delete also supports bulk operations based on metadata. Deleting a job differs from canceling a job in that deleted jobs will have their history purged, and they will never be returned from a subsequent HTTP GET call. If the user tries to HTTP DELETE a job that has already been DELETEd, the service 102 will return an HTTP 404 Not Found response.

Some embodiments may include functionality for updating a job. Jobs can be updated through an HTTP PATCH operation to a job's address. In some embodiments, the format of the request is the same as that for creating a job, though if a field is unspecified embodiments will carry forward the current value. If the remote based, time bound, or period scheduling service job is a currently executing a recurring job, then the web service will send a notification to the workflow instance to update its job configuration (such as its recurrence/action/start time). Update also supports bulk operations based on metadata. In these cases, all of the matching jobs will be updated with the deltas provided in the HTTP PATCH payload.

In some embodiments, the following values are not allowed in a HTTP PATCH request:

"status": <XXX>
"id": <any value that doesn't match the URI-specified ID>
"state": "completed" (other state values are allowed)

Some embodiments include functionality for canceling an active job. For example, jobs can be canceled by sending a HTTP PATCH that includes "state": "canceled". The reason for cancellation can optionally be included in a metadata property, such as the "stateDetails" property illustrated herein, of the job.

Invalid HTTP PATCH properties may occur, for example, updating the state to "completed" or updating the status property are not supported in HTTP PATCH and will return a HTTP 4xx Client Error.

Embodiments may include functionality for suspending an active job. A remote based, time bound, or period scheduling service job can be suspended in the following ways:

1. It is initially created as a suspended job, to be enabled at a later time; or
2. It is a recurring job that the user updates with a POST to <jobaddress>/suspend. Alternatively, the user can update as a PATCH with "status": "suspended".

Suspended jobs have a state of "Suspended".

In both cases, the reason for suspending the job can optionally be included in a metadata property, such as the "stateDetails" property illustrated herein, of the job. FIG. 2 illustrates at 210 that a suspend message is received. This causes the action to be marked, as illustrated at 212, as suspended.

Embodiments may include functionality for resuming a suspended job. For example, suspended jobs may be resumed by sending a HTTP POST request to <jobaddress>/resume. Alternatively, suspended jobs are resumed by sending a PATCH that includes "state": "running". The reason for resumption can optionally be included in the "stateDetails" property of the job. FIG. 2 illustrates at 214 that a resume message can be received. The action, as illustrated at 216, can be marked as resumed to allow the action to resume.

Embodiments may include functionality for getting the history of a job. When remote based, time bound, or period scheduling service jobs execute, they record a log of their progress. This can be accessed through a HTTP GET call to <jobaddress>/history. The response is a JSON array of history objects. For example:

```
[
  {
    "timestamp": "2012-05-01T18:56:46",
    "message": "Job Created"
  },
  {
    "timestamp": "2012-05-01T18:56:46.7",
    "message": "Waiting until '5/1/2012 7:57:00 PM' (Action = Http 'Get' @ 'http://Microsoft.com'"
  },
  {
    "timestamp": "2012-05-01T18:57:22",
    "message": "Received 200 OK from 'http://Microsoft.com'"
  },
  {
    "timestamp": "2012-05-01T19:57:00.753",
```

-continued

```
    "message": "Waiting until '5/1/2012 8:57:00 PM' (Action = Http 'Get' @ 'http://Microsoft.com'"
  }
]
```

Some embodiments may include support for timers that fire within a specified range (for example between 8:00 and 9:00 AM) rather than at absolute times. If there is flexibility in scheduling when times jobs are performed, then embodiments may be able to load balance pending jobs. Additionally, in a software as a service environment, service providers may be able to provide scheduling at discount rates to users if the users are able to allow for some flexibility as to when jobs are scheduled.

The query parameters may conform to a backend's native support for querying activation parameters. For example, in some systems, the metadata key length cannot exceed 50 characters and value cannot exceed 255 characters. In some embodiments, the query itself is an exact match on the metadata value and all of the provided metadata keys must match.

In some embodiments, the remote based, time bound, or period scheduling service endpoint is exposed only through https, to help mitigate information disclosure threats.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
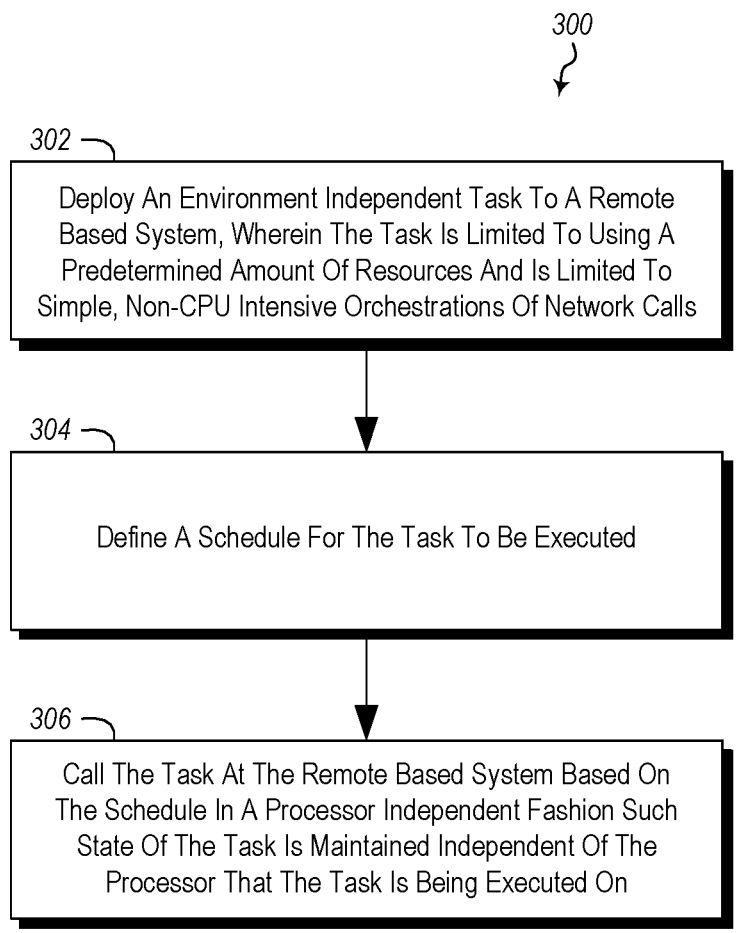
FIG. 3 illustrates a method of scheduling a scheduled and optionally periodic action in a remote based system.

Referring now to FIG. 3, a method 300 is illustrated. The method includes acts for scheduling a scheduled and optionally periodic action in a remote based system. The method includes deploying an environment independent action to a remote based system (act 302). The action is limited to using a predetermined amount of resources and is limited to simple, non-CPU intensive orchestrations of network calls.

The method 300 further includes defining a schedule for the action to be executed. For example, the action may be scheduled to be performed at a given absolute time, such as "on Dec. 29, 2012 at 3:30 P.M." alternatively, the action may be scheduled to be performed "every 30 minutes".

The method 300 further includes calling the action at the remote based system based on the schedule in a processor independent fashion such state of the action is maintained independent of the processor that the action is being executed on. For example, the action may be called using continuation based runtimes.

The method 300 may be practiced where the orchestrations of network calls include of one or more of document requests, sending SMS text message, or posting to a bulletin board.

The method 300 may be practiced where the orchestrations of network calls comprises one or more calls that are secured by external tokens allowing the calls to be made with the authority of the action creator. For example, embodiments may allow the use of passwords or the presentation of other tokens to allow actions to be performed. The orchestration of network calls can obtain such external tokens by calling a third service. One example of such a service is Windows Azure® Access Control Service.

The method 300 may further include determining that one or more of the network calls was unable to be successfully executed. For example, a processor may become disabled or go down. As a result, the state of the action can be rehydrated and used by a different processor to resume or repeat processing of the action.

The method 300 may further include maintaining a history of the state. For example, the state may be logged. Embodiments may therefore include providing a view of the history of the state to an end user. Alternatively or additionally, embodiments may use the history of the state to create a report. For example, based on the history of the state, an auditing report, usage report, or debugging report may be generated.

The method 300 may be practiced where calling the action at the remote based system is based both on the schedule and a set of rules. For example, both a temporal condition, as well as rule based conditions may need to occur before an action can be called. This may include some embodiments that also include provisions for dealing with error conditions.

Various changes can be made after an action has been scheduled. For example, the method 300 may further include updating the schedule after it has been defined. Alternatively or additionally, the method 300 may further include suspending the scheduled action. The action could be suspended indefinitely or for a scheduled amount of time. Thus, embodiments may further include resuming the suspended scheduled action. Alternatively or additionally, embodiments may include cancelling the scheduled action, such that it cannot be resumed.

The method 300 may further include determining that the action should no longer be performed. For example, a determination may be made that an action has performed a certain number of predetermined times, that a time period for performing the action has expired, that some ending event has occurred, etc.

The method 300 may be practiced where the action is a composite action comprising a set of actions. For example, the action could be a set of action occurring in series or parallel. The action could be a set of actions defined by a flow chart. The action could be a set of actions defined by a set of rules. Etc.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform actions. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of scheduling a scheduled and optionally periodic action in a remote based system, the method comprising:
    deploying an environment independent action to a remote based system, wherein the action is limited to using a predetermined amount of resources and is limited to simple, non-CPU intensive orchestrations of network calls;
    defining a schedule for the action to be executed; and
    calling the action at the remote based system based on the schedule in a processor independent fashion such that state of the action is maintained independent of the processor that the action is being executed on.

2. The method of claim 1, wherein the orchestrations of network calls include of one or more of document requests, sending SMS text messages, posting to a bulletin board, sending email, posting social media updates or simple administrative actions.

3. The method of claim 1, wherein the orchestrations of network calls comprises one or more calls that are secured by external tokens allowing the calls to be made with the authority of the action creator.

4. The method of claim 1, further comprising determining that one or more of the network calls was unable to be successfully executed, and as a result, the state of the action can be used by a different processor to resume or repeat processing of the action.

5. The method of claim 1, further comprising maintaining a history of the state.

6. The method of claim 5, further comprising providing a view of the history of the state to an end user.

7. The method of claim 5, further comprising using the history of the state to create a report.

8. The method of claim 1, wherein calling the action at the remote based system is based both on the schedule and a set of rules.

9. The method of claim 1, further comprising updating the schedule after it has been defined.

10. The method of claim 1, further comprising suspending the scheduled action.

11. The method of claim 10, further comprising resuming the suspended scheduled action.

12. The method of claim 1, further comprising cancelling the scheduled action.

13. The method of claim 1, further comprising determining that the action should no longer be performed.

14. The method of claim 1, wherein the action is a composite action comprising a set of actions.

15. The method of claim 1, further comprising updating the action after it has been defined.

16. A system for scheduling a scheduled and optionally periodic action in a remote based system, the system comprising:
    one or more processors; and
    one or more computer storage device comprising computer executable instructions that when executed by at least one of the one or more processors cause at least one of the one or more processors to perform the following:
        deploy an environment independent action to a remote based system, wherein the action is limited to using a predetermined amount of resources and is limited to simple, non-cpu intensive orchestrations of network calls;
        define a schedule for the action to be executed; and
        call the action at the remote based system based on the schedule in a processor independent fashion such that state of the action is maintained independent of the processor that the action is being executed on.

17. The system of claim 16, wherein the orchestrations of network calls include of one or more of document requests, sending sms text messages, posting to a bulletin board, sending email, posting social media updates or simple administrative actions.

18. The system of claim 16, wherein the orchestrations of network calls comprises one or more calls that are secured by external tokens allowing the calls to be made with the authority of the action creator.

19. The system of claim 16, wherein calling the action at the remote based system is based both on the schedule and a set of rules.

20. A distributed computing system which comprises one or more processors and one or more computer storage device containing executable instructions which, when executed by the one or more processors, cause the distributed computing system to instantiate a system architecture which defines a multi-tenant scheduling service for scheduling a scheduled and optionally periodic action in a remote based system, and wherein the system comprising architecture comprises:
    a front end configured to:
        provide a user interface for a user with the system to allow the user to schedule time bound or periodic actions;
        receive user input for remote based time bound or periodic actions; and
        provide time bound or periodic actions to a backend;
    a timer resource configured to maintain a schedule for the action to be executed; and
    wherein the backend is configured to call the action at the remote based system based on the schedule in a processor independent fashion such that state of the action is maintained independent of the processor that the action is being executed on.

* * * * *